April 19, 1949.    K. L. BERNINGER    2,467,955
REGULATOR SEAL
Filed Feb. 12, 1945

INVENTOR
Kenneth L. Berninger
BY
Spencer, Hardman & Fehr
His ATTORNEYS

Patented Apr. 19, 1949

2,467,955

UNITED STATES PATENT OFFICE 2,467,955

REGULATOR SEAL

Kenneth L. Berninger, Dayton, Ohio, assignor to General Motors Corporation, Detroit, Mich., a corporation of Delaware Application February 12, 1945, Serial No. 577,499

5 Claims. (Cl. 286—11.11)

1

This invention relates to aircraft propellers having a regulator and hydraulic means for adjusting the pitch of the blades, and has for an object to provide a controllable seal between regulator housing and an adapter sleeve.

A further object of the invention is to provide a fluid seal between relatively rotatable parts for the elimination of leakage from within the regulator while the rotatable parts are at rest, and for venting the regulator while the parts are relatively rotating.

A further object of the invention is to provide a controllable seal between relatively rotatable parts which seal will engage the parts against leakage while at rest, and will disengage the parts under a condition of rotation of one of the parts.

A further object of the invention is to provide a seal between relatively rotating parts with means for axially shifting the seal element when the sealed condition is either effected or released.

A further object of the invention is to provide a controllable seal between relatively rotating parts with a centrifugal means for engaging and disengaging the seal element with the seal surfaces.

Further objects and advantages of the present invention will be apparent from the following description, reference being had to the accompanying drawings wherein a preferred embodiment of the present invention is clearly shown.

Figure 1:
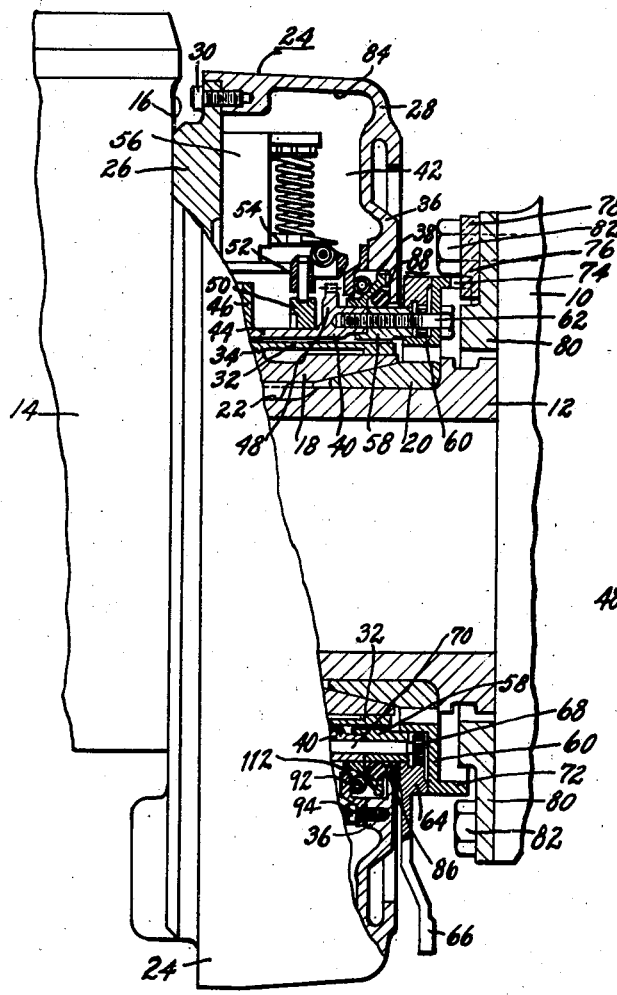
Fig. 1 is a view in elevation with parts broken away so as to show in section the details of the instant invention.

With particular reference to the drawings, 10 indicates an engine nosing or gear casing from which extends a rotatable propeller shaft 12 mounting a propeller hub 14 having a plurality of blade sockets 16. The hub 14 is provided with a rearwardly extending portion or sleeve 18 which engages the usual cone seat 20 carried by the shaft 12, and is effectively driven thru the agency of cooperating splines 22 on the inner portion of the sleeve 18 and on the outer portion of the shaft 12; the usual shaft nut retaining the parts in proper relation as is well known to all those experienced in the art.

Carried by the hub extension 18 is a regulator

2

24 comprising a conduit plate 26 and a cover member 28 secured together by screw devices 30. The conduit plate 26 is supported by the hub extension 18 and is retained thereon by means of a sleeve nut 32 threaded onto the hub extension as at 34. The cover member 28 is somewhat of L-shaped cross-section, but at all events provides a radially inward rim 36 approaching but spaced from the hub extension 18, and is channeled at 38 to provide a seal passage.

Surrounding the hub extension 18 and the sleeve nut 32 there is an adapter assembly 40 that combines with the plate 26 and cover 24 to provide an annular reservoir 42, for housing hydraulic control elements for the propeller, and a quantity of hydraulic operating fluid. Essentially the adapter assembly 40 comprises a sleeve 44 surrounding the sleeve nut 32 and having one end thereof journalled in a bearing 46 secured to the plate 26, while the opposite end of the sleeve 44 carries a pump driving gear 48 axially spaced from the bearing 46, and between which bearing and gear a control ring 50 is axially slidable on the sleeve 44 for shifting a carriage 52 adapted to adjust a fulcrum 54 of a governor valve 56, all of which is well known to those experienced in the art. Attached to the aft end of sleeve 40 that is, near the gear 48, there is a ring 58 acting as a spacer and a centralizer for supporting the sleeve 44 from an annular flange plate 60, by means of screw devices 62 passing thru the plate 60 ring 58, and threading into the sleeve 44. Journalled about the ring 58 there is a ring gear 64 having an actuating arm 66 by which the ring 64 is oscillatable to rotate pinion 68 on control screws 70, that affect axial movement of the control ring 50. The flanged plate 60 on its rearward side has a flange 72 that is notched at 74 to engage a tongue or lug 76 of a clip 78 engaging a piloting ring 80 that is secured to the engine nosing by screw devices such as 82.

By this construction, the adapter assembly 40, while it shiftably surrounds the hub extension 18 it is restrained against rotation relative to the engine nosing by means of the notch and lug engagement 76, and has its fore end journalled within the bearing ring 46, with the spring ring portion 58 thereof being in substantial radial alignment with the flange 36 of the regulator cover. The organization is such that the shaft 12 and hub extension 18 may rotate relative to but within the sleeve portion 44, while the regulator proper, that is, the plate 26 and cover 24 for the enclosed hydraulic fluid, and regulator mechanism such as 56, all rotate relative to but outside of the sleeve 44.

The chamber thus enclosed, is about half filled with the hydraulic fluid and during a state of rotation the fluid will lay along the outer periphery of the chamber due to centrifugal force, such as indicated at 84, in which instance all of the hydraulic fluid seeks a part of the reservoir radially outward of the juncture 86 between the regulator cover and adapter assembly. While the apparatus is at rest all of the hydraulic fluid will drain to the lowermost portion of the regulator 24 because of the absence of centrifugal force. Thus, while at rest the hydraulic fluid, or a goodly portion thereof would be lost by flow from between the flange 36 of the cover and ring 58 of the adapter assembly. To prevent that, a seal assembly 88 is housed within the groove 38 of the cover for stopping such flow while the parts are at rest.

Figure 2:
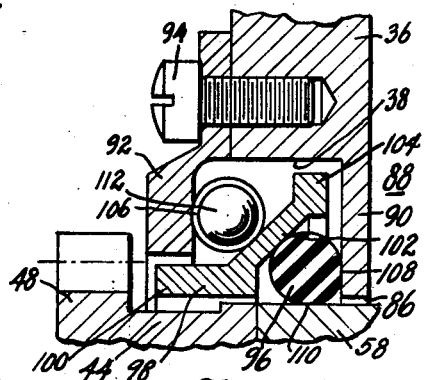
Fig. 2 is a sectional view on an enlarged scale showing the juncture of relatively rotating parts, with the seal in the engaged relation to stop fluid passage between the parts.
Figure 3:
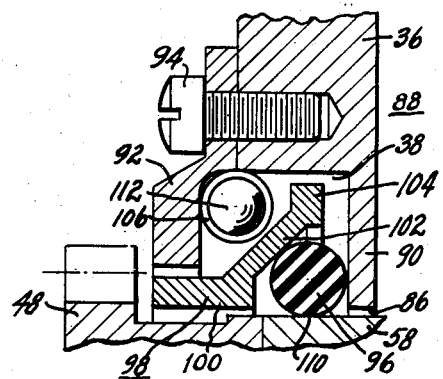
Fig. 3 is a similar view showing the seal elements disengaged for breathing or venting of the regulator.

The seal assembly in detail is illustrated in Figs. 2 and 3, where the parts are shown on a larger scale for clearness, and comprise the rim 36 defining the annular recess 38 bounded on the planar side by a web 90, and on the inner side by a step ring 92 secured to the flange 36 by the screw devices 94, thus rendering the channel 38 substantially U-shape in cross-section with its open side inwardly. This channel therefor forms what may be called a seal groove and cooperates to house a resilient rubber-like seal ring 96, that is so dimensioned that its inside diameter is slightly less than the outside diameter of the spacer ring 58, or such that the seal ring 96 must be stretched slightly in order to pass over the outside of the spacer ring 58. Loosely and axially movable along the aft end of the sleeve 44 there is a follower ring 98 that has a cylindrical portion 100 and an outwardly flaring portion 102, with a peripheral rim 104. The cylindrical portion 100 is freely slidable along the adapter assembly between the pump driving gear 48 and the seal ring 96, and the flaring portion 102 is adapted to engage the seal ring 96 long before the rim 104 may engage the web portion 90. Encircling the follower ring 98 there is a garter spring 106 adapted to engage the flaring portion 102 of the follower ring and the depending portion of the step ring 92. The tension of the spring 106 is such as to normally act from the step ring 92 to press against the flaring portion 102 and crowd the seal ring 96 against the web 90 such as to effect a sealing contact therewith at 108. In addition to this axial pressing of the ring 96 against the web 90 to effect the sealing contact at 108, the spring 106 also effects a radial component of pressure on the seal ring 96 to increase the sealing engagement at 110 in relation to the ring 58. Thus, any fluid content within the reservoir 42 is prevented from leaking thru the space 86 because of the sealing contact at 108 and 110. This seal relation is necessary or desired only during the time that the propeller is at rest and while there is no relative rotation between the cover assembly and the adapter assembly. When there is relative rotation between those parts the hydraulic fluid within the reservoir 42 will be thrown outwardly against the outer wall of the regulator to fill the region indicated at 84, and thereby is far removed from the spacing 86 between the cover and adapter assembly. The garter spring 106 is loaded with weight members, such as balls 112, that operate under centrifugal force to withdraw the spring 106 from engagement with the follower ring 98 at some low speed of regulator rotation, and after the hydraulic fluid has moved outwardly from the inner position.

Fig. 3 illustrates the parts of the seal assembly under the conditions in which centrifugal force has released the engagement between the follower ring 98 and the seal ring 96, and between the seal ring 96 and web portion 90. It will be noted in Fig. 3 that the reservoir 42 is open in a fluid sense to the outside of the regulator, since air or gases may freely flow thru a circuit between the pump driving gear 48 and the step ring 92, and between the step ring 92, spring 106 and balls 112 on one hand, and the flaring portion 102 on the other hand, thence between the rim 104 and the flange 36 and web 90, and thence between the ring 96 and web 90 and finally between the end of the web 90 and ring 58, and out of the annular space 86. Thus, in the retracted position of the spring assembly and seal ring gaseous flow may be effected either inwardly to or outwardly from the reservoir, which provides for breathing or venting of the regulator tending to equalize the pressure within and without while the apparatus is rotating.

During aircraft flight in which vast differences of air pressure are experienced between take-off and high level flying there is experienced vast differences of air pressure, and were it not for a releasable seal for the reservoir there would be considerable loss of hydraulic fluid as the craft would go thru the various flight levels. Efficiency of operation would also be imposed and there might even be an explosion of some of the controlling apparatus.

The seal arrangement herein described not only controls the seal relation between the movable parts in accordance with the demands of the operating system, but it also eliminates friction of running parts when the seal is retracted, thus prolonging the life of the seal elements, since wear upon the vital elements is wholly withdrawn as soon as a satisfactory speed of rotation is accomplished. Yet, when the apparatus slows down so that there is little or no relative rotation between the moving parts, then the resilient seal ring 96 is forceably urged into sealing engagement with the web 90 at 108 and with the ring 58 at 110. The amount of relative rotation between the parts, and the spring force urging the seal ring into engagement with the web and ring are so calibrated that there is no chafing of the seal ring due to the small amount of regulator rotation during seal set condition. As soon as the regulator rotation is high enough to cast the hydraulic fluid entirely away from the space 86, or in fact away from the adapter sleeve 44 the spring force is released from the follower ring and consequently from the seal ring, so that there is no sliding engagement between the ring 96 and web 90. What little sliding relation there is between the seal ring 96 and web 90, which can only take place at times when the regulator rotation is starting or is stopping, is thoroughly lubricated by the hydraulic fluid that may be present in the U-shaped channel between the step ring 92 and the web 90 while the apparatus was at rest.

While the embodiment of the present invention as herein disclosed, constitutes a preferred form, it is to be understood that other forms might be adopted, all coming within the scope of the claims which follow.

What is claimed is as follows:

1. A relatively fixed part, a relatively rotatable part disposed about the fixed part, one of said parts providing a channel opening toward the other part, a loose resilient seal ring disposed in said channel and adapted to engage one side wall of the channel and the said other part for stopping fluid flow between the parts, a follower ring having a part disposed in the channel and movable axially for engagement with the resilient seal ring, circumscribing yielding means disposed in the channel normally urging the follower ring into engagement with the seal ring and the seal ring into engagement with the channel wall, and means responding to predetermined speed of rotation of the rotatable part for releasing the axial pressure upon the seal ring.

2. The combination set forth in claim 1, in which the follower ring has a conic portion engageable with the resilient ring, said yielding means engaging a wall of the channel and said conic portion to cam the loose resilient ring axially of the rotatable part.

3. A relatively fixed part, a relatively rotatable part disposed about the fixed part, one of said parts providing a channel opening toward the other part and having opposed planar walls, a resilient rubber-like seal-ring of circular section disposed in the said channel frictionally engaging the said other part, and adapted to be rolled along said other part to engage one of the planar walls of said one part, a loose ring having a camming surface engageable with the seal ring for rolling it against the planar wall, centrifugally responsive means operable to engage upon the loose ring while the parts are at rest to engage the seal ring with the planar wall, and operable under rotation of the rotatable part to disengage from the loose ring so that the seal ring may back off from engagement with the planar wall.

4. A relatively fixed cylindrical part, a relatively rotatable part disposed about the fixed part and having a channel facing the fixed part, a rubber-like resilient ring disposed in the channel and under tension to frictionally engage the fixed part, said resilient ring being adapted to roll on the fixed part into and out of engagement with a side of the channel, a rigid ring disposed in the channel loosely embracing the fixed part and having a flared portion adapted to engage the resilient ring upon axial movement of the rigid ring, centrifugally responsive means normally urging the rigid ring against the resilient ring when there is no relative rotation between the parts and operable to release pressure thereon when a predetermined relative rotation has been attained, whereby a seal will be established during non-rotation of the parts.

5. A relatively fixed cylindrical part, a relatively rotatable part disposed about the fixed part and having a channel facing the fixed part, with the edge of one wall of the channel radially spaced from the fixed part, a rubber-like ring of circular section disposed in the channel and stretched to frictionally engage the fixed part in a line contact but adapted to roll axially thereof to engage the channel wall along a line of contact and to roll away therefrom, a rigid ring disposed in the channel and adapted to move axially of the fixed part, said rigid ring having a conic portion adapted to engage the rubber-like ring along a line of contact, yielding means circumscribing the conic portion of said rigid ring and engaging one wall of said channel for normally moving the rigid ring axially of the fixed part to increase the pressure of engagement along all of the lines of contact while the parts are not relatively rotating, and means responding to centrifugal force during relative rotation of the parts for decreasing the pressure along all lines of contact.

KENNETH L. BERNINGER.

REFERENCES CITED

The following references are of record in the file of this patent:

UNITED STATES PATENTS

| Number | Name | Date |
| --- | --- | --- |
| 1,353,095 | Uttech et al. | Sept. 14, 1920 |
| 2,076,747 | Salisburg | Apr. 13, 1937 |
| 2,352,336 | Martin et al. | June 27, 1944 |

FOREIGN PATENTS

| Number | Country | Date |
| --- | --- | --- |
| 182,441 | Great Britain | 1922 |
| 457,544 | Germany | 1928 |